US012313984B2

(12) United States Patent
Luke et al.

(10) Patent No.: US 12,313,984 B2
(45) Date of Patent: May 27, 2025

(54) DISRUPTIONS OF TONER TRANSFERS FROM DEVELOPERS TO PHOTORECEPTORS

(71) Applicant: Hewlett-Packard Development Company, L.P., Spring, TX (US)

(72) Inventors: Jeffrey Harold Luke, Boise, ID (US); Justin D. Pettingill, Boise, ID (US); Gabriel Scott McDaniel, Boise, ID (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 8 days.

(21) Appl. No.: 18/572,770

(22) PCT Filed: Jul. 9, 2021

(86) PCT No.: PCT/US2021/041017

§ 371 (c)(1),
(2) Date: Dec. 20, 2023

(87) PCT Pub. No.: WO2023/282908

PCT Pub. Date: Jan. 12, 2023

(65) Prior Publication Data

US 2024/0295836 A1 Sep. 5, 2024

(51) Int. Cl.

| | |
|---|---|
| ***G03G 15/00*** | (2006.01) |
| ***G03G 15/02*** | (2006.01) |
| ***G03G 15/045*** | (2006.01) |
| ***G03G 15/06*** | (2006.01) |
| ***G03G 15/08*** | (2006.01) |
| ***G03G 21/00*** | (2006.01) |
| ***G03G 21/08*** | (2006.01) |

(52) U.S. Cl.
CPC ....... *G03G 15/065* (2013.01); *G03G 15/0216* (2013.01); *G03G 15/0266* (2013.01);
(Continued)

(58) Field of Classification Search
CPC ........... G03G 15/0216; G03G 15/0266; G03G 15/0291; G03G 15/045; G03G 15/065;
(Continued)

(56) References Cited

U.S. PATENT DOCUMENTS 4,244,647 A 1/1981 Fujiwara
8,670,690 B2 3/2014 Jang et al.
(Continued)

FOREIGN PATENT DOCUMENTS

EP 0652492 A1 * 5/1995 ......... G03G 15/0216
JP 62-047070 A 2/1987
(Continued)

*Primary Examiner* — Sophia S Chen
(74) *Attorney, Agent, or Firm* — Foley & Lardner LLP

(57) ABSTRACT

An apparatus includes a developer to receive a toner, and an actuator moveable between different positions. An electrical switch is responsive to an input stimulus from the actuator to control a voltage that enables or disrupts a transfer of the toner from the developer to a photoreceptor, where the electrical switch when in a first state sets the voltage at a first level to enable the transfer of the toner from the developer to the photoreceptor, and the electrical switch when in a second state sets the voltage at a second level to disrupt the transfer of the toner from the developer to the photoreceptor.

15 Claims, 6 Drawing Sheets

(52) U.S. Cl.
CPC ....... *G03G 15/0291* (2013.01); *G03G 15/045* (2013.01); *G03G 15/0812* (2013.01); *G03G 15/80* (2013.01); *G03G 21/0094* (2013.01); *G03G 21/08* (2013.01)

(58) Field of Classification Search
CPC ............... G03G 15/0812; G03G 15/80; G03G 21/0094; G03G 21/06; G03G 21/08; G03G 21/1647; G03G 21/1652; G03G 5/153
See application file for complete search history.

(56) References Cited

U.S. PATENT DOCUMENTS

| | | | |
|---|---|---|---|
| 9,804,560 | B2 | 10/2017 | Sato et al. |
| 10,228,652 | B2 | 3/2019 | Sato et al. |
| 10,564,568 | B2 | 2/2020 | Jung et al. |
| 10,678,185 | B2 | 6/2020 | Uneme et al. |
| 10,712,708 | B2 | 7/2020 | Sato et al. |
| 2004/0156647 | A1 | 8/2004 | Ishikawa et al. |
| 2007/0053718 | A1 | 3/2007 | Choi |
| 2013/0129381 | A1 | 5/2013 | Jang et al. |

FOREIGN PATENT DOCUMENTS

| | | | |
|---|---|---|---|
| JP | 08-220964 | A | 8/1996 |
| JP | 2001-337511 | A | 12/2001 |
| JP | 2005-049525 | A | 2/2005 |
| JP | 2009-258480 | A | 11/2009 |
| JP | 2010-072500 | A | 4/2010 |
| JP | 2019-191553 | A | 10/2019 |
| KR | 10-0629497 | B1 | 9/2006 |
| WO | 2014/038644 | A1 | 3/2014 |
| WO | 2014/142352 | A1 | 9/2014 |
| WO | 2016/017105 | A1 | 2/2016 |

* cited by examiner

DISRUPTIONS OF TONER TRANSFERS FROM DEVELOPERS TO PHOTORECEPTORS

CROSS-REFERENCE TO RELATED APPLICATIONS

This application is a U.S. National Stage Patent Application under 35 U.S.C. § 371 of PCT/US2021/041017, filed Jul. 9, 2021, which is hereby incorporated by reference in its entirety.

BACKGROUND

A printing device can deliver a print material to a print medium to form an image on the print medium. In some examples, a printing device can be an electrophotographic printing device that supplies a toner (which is a type of print material) to an electrostatic latent image formed on a photoreceptor to form a visible toner image on the photoreceptor. The electrophotographic printing device transfers the toner image to a print medium, and then fixes the transferred toner image to the print medium, to form an image on the print medium.

BRIEF DESCRIPTION OF THE DRAWINGS

Some implementations of the present disclosure are described with respect to the following figures.

Figure 1A:
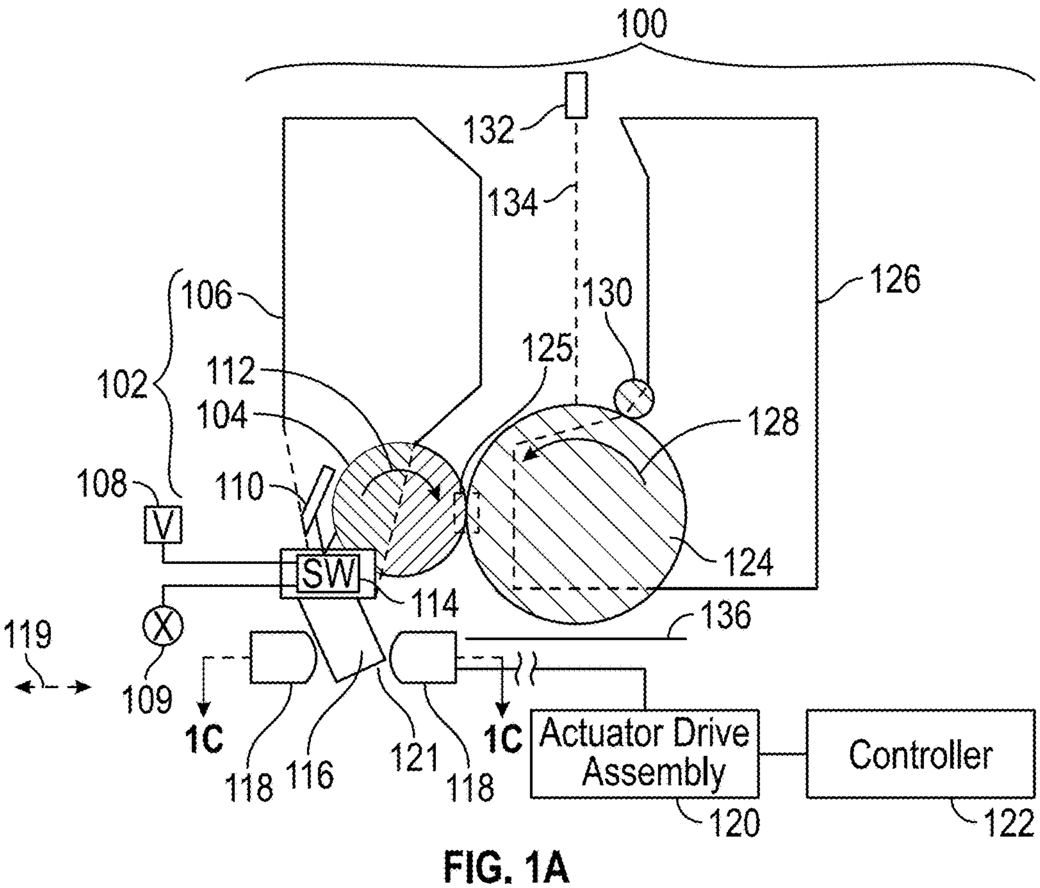
FIGS. 1A-1B, 2A-2B, and 3A-3B are schematic diagrams of a portions of image forming devices according to some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

An image forming device such as an electrophotographic printing device can employ a photoreceptor on which an electrostatic latent image is formed, for use in transferring an image to a target medium (e.g., a print medium such as a paper substrate or a substrate of another material). The photoreceptor can be in the form of a photosensitive drum that includes a cylindrical tubular structure and a photosensitive layer on the cylindrical tubular structure.

A charging element can be used to charge a surface of the photosensitive drum to a uniform electrical potential (e.g., a negative electrical potential). In some examples, the charging element can include a charging roller. In other examples, a charging element can be in the form of a corona charger that can charge the surface of the photosensitive drum to a uniform electrical potential without making physical contact with the surface of the photosensitive drum.

A light source (e.g., a laser source, light emitting diode(s) (LEDs), etc.) can be activated by a controller of the image forming device to irradiate selected portions of the charged surface of the photosensitive drum, to form an electrostatic latent image on the photosensitive drum.

A developing device in the image forming device includes a developer (e.g., a developing roller) onto which a developing agent including an electrically charged toner is adhered. During operation of the image forming device, as the developing roller rotates relative to the photosensitive drum (which also rotates in the opposite rotational direction of the developing roller), the developing agent on the developing roller is conveyed to a supply region facing the photosensitive drum. In this supply region, a layer of toner adhered to the surface of the developing roller can be transferred to the photosensitive layer of the photosensitive drum on which the electrostatic latent image has been formed, which develops the electrostatic latent image on the surface of the photosensitive drum to form a visible toner image on the photosensitive drum.

In some examples, the developing device including the developing roller can be part of a cartridge that is removably inserted into the image forming device. The cartridge can include a reservoir containing a toner, and the toner in the reservoir can be transferred to the developing roller. A user may remove an existing cartridge and insert a new cartridge into the image forming device, such as when the toner of the existing cartridge is depleted.

When the cartridge is inserted into an image forming device, the developing roller is energized by applying a bias voltage to the outer surface of the developing roller. The electrically charged toner in the reservoir of the cartridge is electrically attracted by the bias voltage to the outer surface of the developing roller.

In some cases, the developing roller is continually energized (the bias voltage is continually applied to the developing roller) so long as the cartridge remains inserted in the image forming device and the image forming device is in an active state (e.g., the image forming device is not powered off or in a sleep mode). When the developing roller is energized, rotation of the developing roller continues to attract toner to the developing roller, and in conjunction with a rotation of the photosensitive drum, the toner is transferred to the photosensitive drum.

In some examples, an ability to selectively control whether or not toner can be transferred from the developing roller to the photosensitive drum during an active operation of an image forming device is not available. As a result, a user of the image forming device is not provided with the flexibility to selectively disrupt the transfer of toner from the developing roller to the photosensitive drum while the image forming device is active, such as during an image forming operation (e.g., performed as part of a maintenance of the image forming device, or a test of the image forming device, or during normal use by a customer of the image forming device). The ability to selectively disrupt a transfer of the toner from the developing roller to the photosensitive drum can be useful for various purposes, such as to test the cartridge or the image forming device, to perform maintenance of the cartridge or the image forming device, to check a status of the cartridge or the image forming device, and so forth.

In accordance with some implementations of the present disclosure, techniques or mechanisms are provided to selectively control a transfer of a toner from a developer (e.g., a developing roller or another type of developer) to a photoreceptor (e.g., a photosensitive drum or another type of photoreceptor) during an image forming operation of an image forming device (e.g., during a print operation). The selective control of the transfer of toner from the developer to the photoreceptor can be achieved based on one of several techniques, as discussed further below.

The selective control can include selectively enabling or disrupting the transfer of the toner from the developer to the photoreceptor. Enabling the transfer of the toner from the developer to the photoreceptor refers to allowing the toner to be transferred from the developer to the photoreceptor in a target manner during an image forming operation to support formation of a target image on a target medium (e.g., a print medium).

Disrupting the transfer of the toner from the developer to the photoreceptor can refer to disabling the transfer of the toner from the developer to the photoreceptor, or modifying (e.g., reducing or changing the locations) the transfer of the toner from the developer to the photoreceptor.

In the ensuing discussion, reference is made to examples in which a developer is in the form of a developing roller, and a photoreceptor is in the form of a photosensitive drum. In other examples, other types of developers and/or photoreceptors can be employed.

Figure 1B:
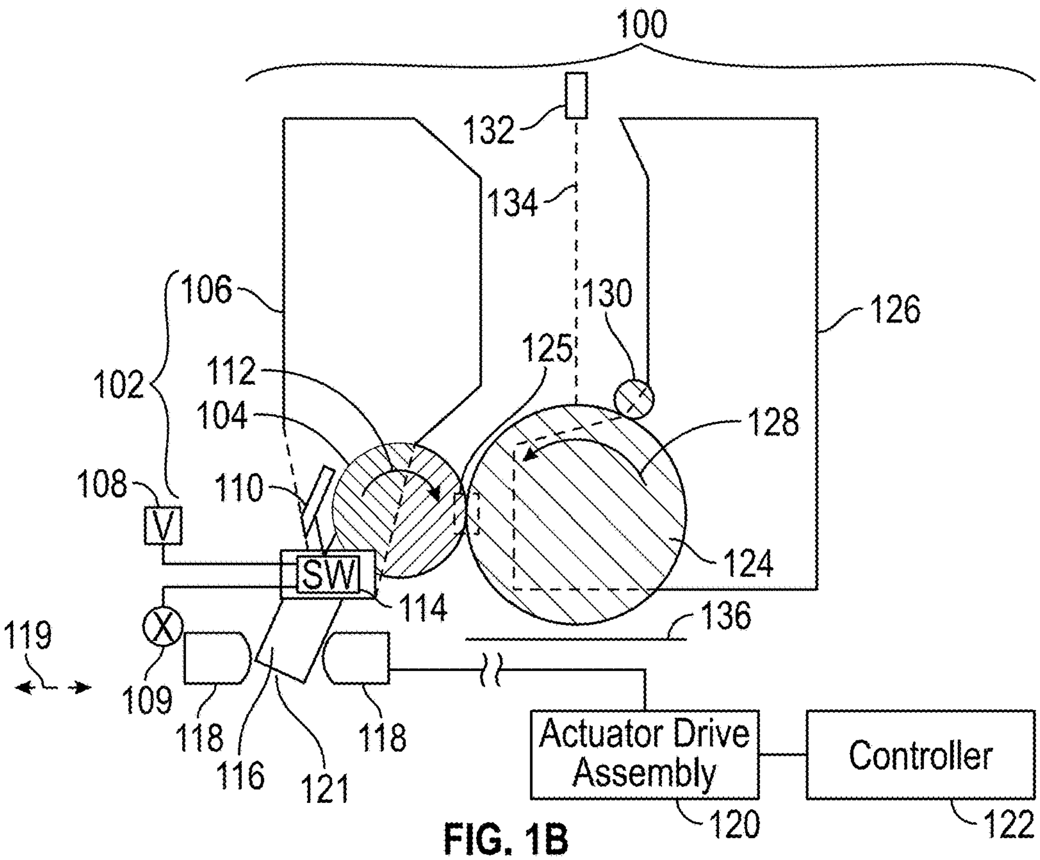

FIGS. 1A-1B illustrate portions of an image forming device 100 including a lever 116 at respective different positions, in accordance with some implementations of the present disclosure. Note that some portions of the image forming device 100 are not shown in FIGS. 1A and 1B for brevity.

The image forming device 100 includes a developing device 102 that includes a developing roller 104, a reservoir 106, and a regulator 110 (the developing device 102 can include other components not shown). The reservoir 106 contains a developing agent that includes an electrically charged toner. For example, the developing agent can include the electrically charged toner, a mixture of the electrically charged toner and a liquid carrier, or the toner with carrier particles.

During an image forming operation of the image forming device 100, a bias voltage can be applied to the developing roller 104. The bias voltage is supplied from a voltage source 108 of the image forming device 100.

In some examples, the regulator 110 regulates a thickness of a toner that is adhered to the outer surface of the developing roller 104. The regulator 110 can be in the form of a regulating blade or another type of regulator. A tip of the regulating blade can come into contact or close proximity with the outer surface of the developing roller 104. As the developing roller 104 rotates in a first rotational direction 112, the electrically charged toner is transferred from the reservoir 106 to the outer surface of the developing roller 104 (the electrically charged toner is attracted to the outer surface of the developing roller 104 by the bias voltage applied to the developing roller 104). The regulator 110 sets the thickness of the toner on the developing roller 104 to be uniform as the developing roller 104 rotates.

In some examples, the regulator 110 can also be set to the bias voltage from the voltage source 108.

As further shown in FIG. 1A, an electrical switch 114 when active (e.g., closed) allows the bias voltage from the voltage source 108 to be electrically connected to the developing roller 104 and the regulator 110. The state of the electrical switch 114 is controlled by a position of the lever 116. In FIG. 1A, the lever 116 is at a first position. In FIG. 1B, the lever 116 has been moved to a second position that is different from the first position. In the second position of the lever 116, the state of the electrical switch 114 has been changed from the active state (closed state) shown in FIG. 1A to an inactive state (open state) shown in FIG. 1B.

More generally, the electrical switch 114 can have a first state that sets a voltage of the developing roller 104 at a first level (e.g., the level of the bias voltage from the voltage source 108), and a second state that sets a voltage of the developing roller 104 at a second level that is different from the first level. For example, when the electrical switch 114 is in the second state (e.g., the inactive state of FIG. 1B), the electrical switch 114 can connect the developing roller 104 (and the regulator 110) to a node 109, which can be a floating node (a node that is not connected to a voltage or ground), a ground node connected to a ground of the image forming device 100, or a further voltage source (different from the voltage source 108).

If the node 109 is the ground node, then the electrical switch 114 in the second state sets the outer surface of the developing roller 104 to a ground reference level. If the node 109 is the further voltage source, then the electrical switch 114 in the second state sets the outer surface of the developing roller 104 to a further voltage of the further voltage source. For example, if the bias voltage of the voltage source 108 is a positive voltage, then the further voltage can be a negative voltage (or vice versa). If the node 109 is the floating node, then the electrical switch 114 in the second state allows the outer surface of the developing roller 104 to be set at a voltage level, such as a voltage from a pull-down or pull-up resistor to a ground or another voltage level.

The electrical switch 114 can have any of various forms, such as a field effect transistor (FET), a rotary switch, a logic gate, a pressure switch, and so forth. Generally, an "electrical switch" refers to an active element that is controllable to have one of multiple different states, where in a first state the active element electrically connects a first set of nodes of the active element, and in a second state the active element electrically disconnects the first nodes of the active element (and may electrically connect a second set of node of the active element).

FIGS. 1A-1B show an example of a mechanical member in the form of the lever 116 controlling the state of the electrical switch 114 based on different positions of the lever 116. In other examples, the state of electrical switch 114 can be controlled in a different manner, such as electrically, magnetically, and so forth.

Figure 1C:
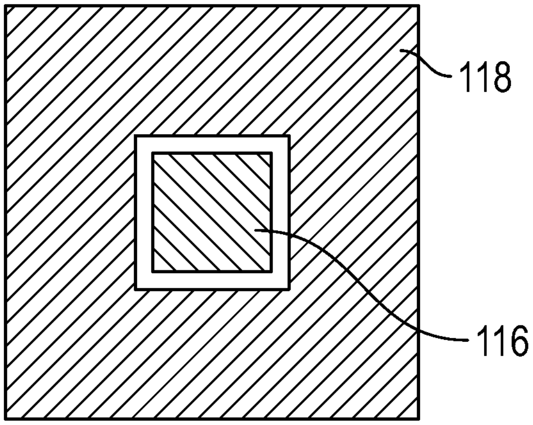
FIG. 1C is a cross-sectional view of an actuator of an actuator assembly, according to some examples.

In examples according to FIGS. 1A-1B, the position of the lever 116 is controlled by an actuator 118. In some examples, the actuator 118 includes a receptacle 121 to receive the lever 116. Movement of the actuator 118 between different positions (along an axis 119 as shown in FIG. 1A-1B) causes the lever 116 to move between different positions. FIG. 1C shows a cross-sectional view of the actuator 118 taken along section 1C-1C in FIG. 1A. The actuator 118 is generally ring-shaped (a square ring in the example shown in FIG. 1C, although other shapes can be used in other examples). The opening in the center corresponds to the receptacle 121 of FIGS. 1A-1B. In other examples, the actuator 118 does not surround all sides of the lever 116.

The actuator 118 is moved by an actuator drive assembly 120 of the image forming device 100. In some examples, the actuator drive assembly 120 can include a motor, a solenoid mechanism, an assembly of gears, or any other type of assembly that can impart motion on the actuator 118. The actuator drive assembly 120 can be controlled by a controller 122 of the image forming device 100. In some examples, the controller 122 can control image forming operations and/or other operations of the image forming device 100.

As used here, a "controller" can refer to a hardware processing circuit, which can include any or some combination of a microprocessor, a core of a multi-core microprocessor, a microcontroller, a programmable integrated circuit, a programmable gate array, or another hardware processing circuit. Alternatively, a "controller" can refer to a combination of a hardware processing circuit and machine-readable instructions (software and/or firmware) executable on the hardware processing circuit.

In examples according to FIGS. 1A-1B, the actuator 118 slides left and right (in the view of FIGS. 1A-1B) along the axis 119 in response to being driven by the actuator drive assembly 120 under control of the controller 122. In other examples, the actuator 118 can be pivoted, rotated, or caused to have another type of motion based on being driven by the actuator drive assembly 120 under control of the controller 122.

A photosensitive drum 124 is located in close proximity with the developing roller 104 in a supply region 125 where the toner is to be transferred from the developing roller 104 to the photosensitive drum 124. In some examples, an outer surface of the developing roller 104 can make physical contact with the outer surface of the photosensitive drum 124. In other examples, the outer surface of the developing roller 104 is in sufficiently close proximity to the outer surface of the photosensitive drum 124 such the toner that is on the outer surface of the developing roller 104 can be transferred to the outer surface of the photosensitive drum 124 (or more specifically, to the outer surface of a photosensitive layer of the photosensitive drum 124). In some examples, the photosensitive drum 124 is rotatably supported by a support 126.

In some examples, the developing device 102, the switch 114, the actuator 118, the photosensitive drum 124, and the support 126 can be part of a housing of a removable cartridge that is removably mounted in the image forming device 100. The cartridge has a housing in which or to which the developing device 102, the switch 114, the actuator 118, the photosensitive drum 124, and the support 126 are located or attached.

During an image forming operation, the photosensitive drum 124 is rotated in a second rotational direction 128, which is opposite the first rotational direction 112 of the developing roller 104. For example, the first rotational direction 112 is a clockwise direction, while the second rotational direction 128 is a counterclockwise direction (or vice versa). In other examples, the developing roller 104 and the photosensitive drum 124 can rotate in the same direction.

As further shown in FIG. 1A, an imaging charging element 130 when energized is used to charge the outer surface of the photosensitive drum 124 to a uniform electric potential. The imaging charging element 130 can include a charging roller or a corona charger, according to some examples.

The image forming device 100 further includes a light source 132 to irradiate selected portions of the electrically charged outer surface of the photosensitive drum 124 with light 134. The light 134 from the light source 132 is modulated according to image data received by the controller 122. The image data defines the image to be formed on a target medium 136, such as a print substrate. Note that the light source 132 is external of the cartridge and is part of the image forming device 100.

Each portion of the electrically charged outer surface of the photosensitive drum 124 with the light 134 will have the portion's electric potential changed (from the electric potential charged by the imaging charging element 130). In some examples, the selected portions irradiated with the light 134 correspond to respective portions of an image to be formed on the target medium 136. In other examples, the selected portions irradiated with the light 134 correspond to respective portions where an image is not to be formed on the target medium 136.

The irradiation of the outer surface of the photosensitive drum 124 with the light 134 forms an electrostatic latent image on the outer surface of the photosensitive drum 124. Toner is transferred from the developing roller 104 to the outer surface of the photosensitive drum 124 based on the electrostatic latent image, to develop the electrostatic latent image to form a visible toner image on the outer surface of the photosensitive drum 124.

The toner image on the photosensitive drum 124 can then be transferred to the target medium 136, either directly by the photosensitive drum 124 or indirectly through an intermediate transfer member, such as an intermediate transfer belt, an intermediate roller, and so forth. The intermediate transfer member is not depicted in FIGS. 1A-1B for brevity.

When the electrical switch 114 is active such that the bias voltage from the voltage source 108 is applied to the developing roller 104 and the regulator 110, non-disrupted image forming operations can proceed in which toner is adhered to the developing roller 104 and transferred from the developing roller 104 to the photosensitive drum 124 (while the developing roller 104 and the photosensitive drum 124 rotate in their respective rotational directions 112 and 128), followed by the transfer of the toner image on the photosensitive drum 124 to the target medium 136 (either directly or indirectly).

In FIG. 1B, after the actuator 118 is moved to cause the lever 116 to be moved to the second position, the electrical switch 114 is deactivated, to remove the bias voltage produced by the voltage source 108 from the developing roller 104 and the regulator 110. Removal of the bias voltage from the developing roller 104 and the regulator 110 can refer to setting the developing roller 104 and that the regulator 110 at a ground reference (or other reference) or to a voltage that is different from the bias voltage.

When the bias voltage of the voltage source 108 is not applied to the developing roller 104, the toner in the reservoir 106 is not transferred to the outer surface of the developing roller 104. As a result, even if the developing roller 104 and the photosensitive drum 124 continue to rotate in their respective rotational directions 112 and 128, the absence of the bias voltage from the developing roller 104 would result in no toner being transferred to the outer surface of the developing roller 104, and as a result, no toner would be transferred to the photosensitive drum 124.

More generally, the electrical switch 114 can cause application of a first voltage to the developing roller 104 when the electrical switch 114 is in a first state, and application of a different second voltage to the developing roller 104 when the electrical switch 114 is in a different second state. The first voltage enables the transfer of toner from the developing roller 104 to the photosensitive drum 124, while the second voltage disables the transfer of the toner from the developing roller 104 to the sensitive drum 124. Note that the second voltage can be a ground reference or another voltage different from the first voltage.

Figure 2A:
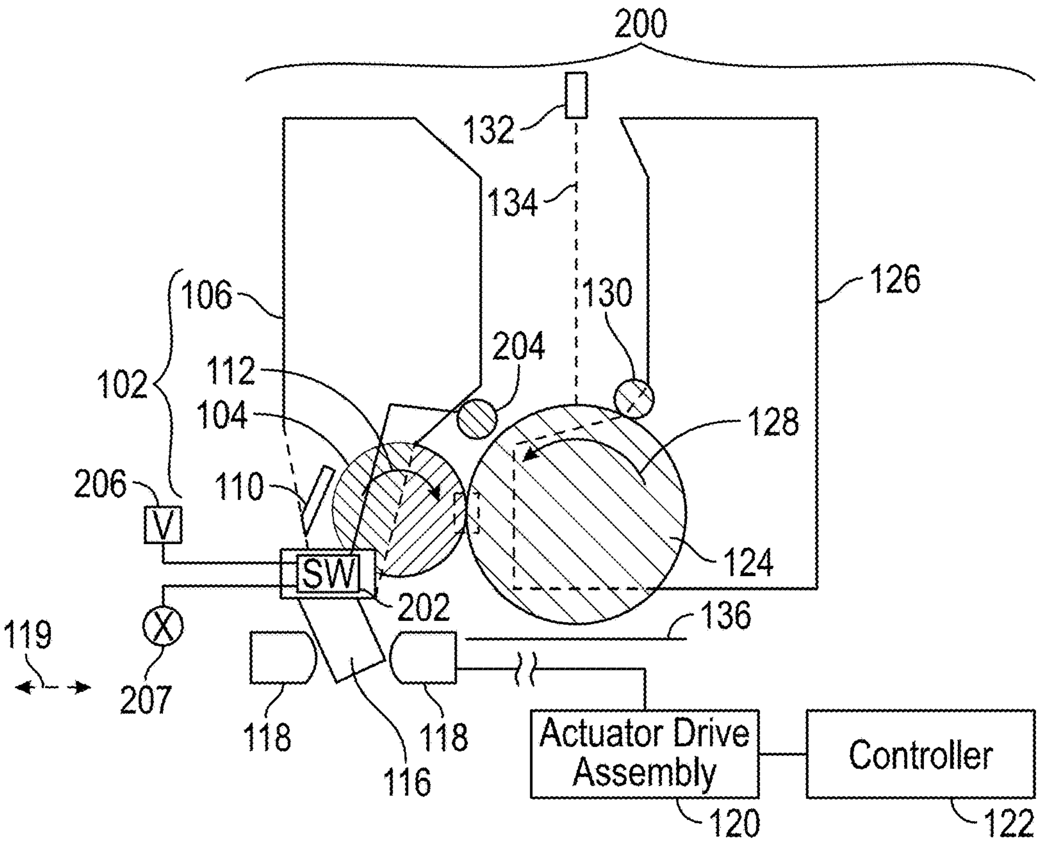
Figure 2B:
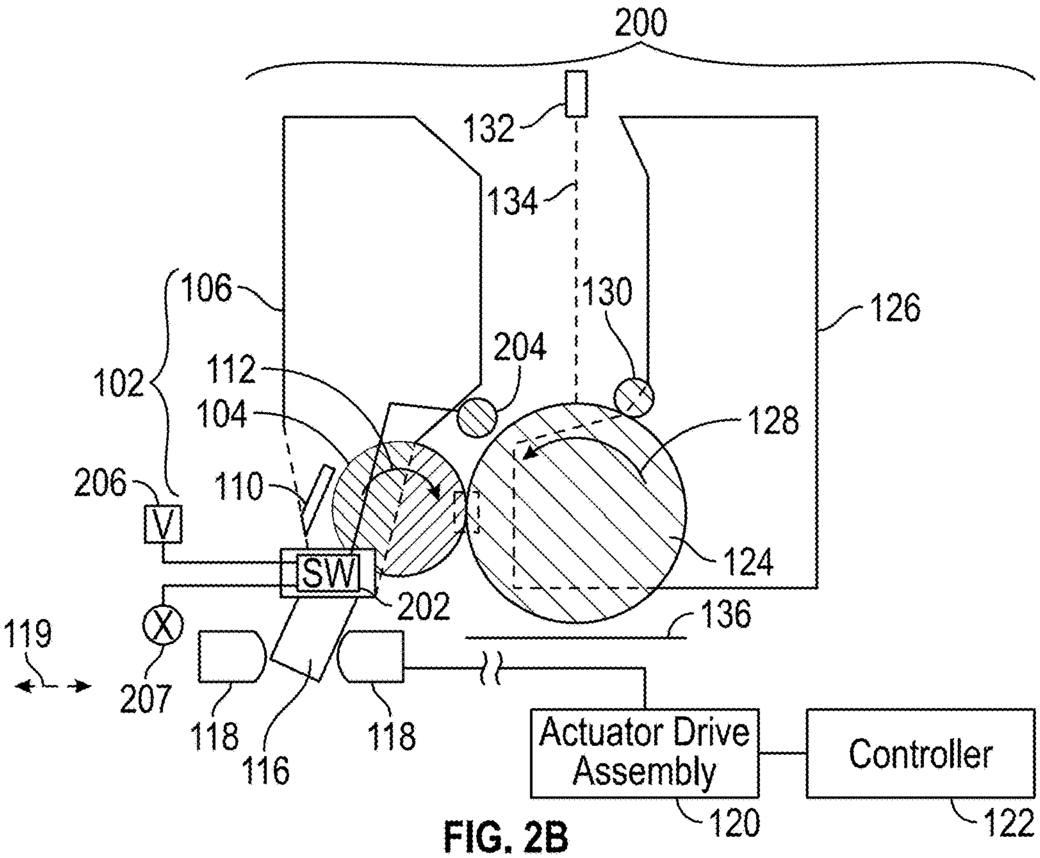

FIGS. 2A-2B show an image forming device 200 according to further examples of the present disclosure. Components of the image forming device 200 similar to those of the image forming device 100 of FIGS. 1A-1B share the same reference numerals.

In examples according to FIGS. 2A-2B, it is assumed that a bias voltage is continually applied to the developing roller 104 during an image forming operation of the image forming device at 200. However, in FIGS. 2A-2B, an electrical switch 202 is used to control a state of a disruption element 204. In the first position of the lever 116 shown in FIG. 2A, the electrical switch 202 is set to an inactive state by the lever 116 being in the first position of FIG. 2A. In the inactive state, the electrical switch 202 does not connect a voltage of a voltage source 206 to the disruption element 204. Instead, the electrical switch 202 can connect the disruption element 204 to a node 207, which can be a floating node (a node that is not connected to a voltage or ground), a ground node connected to a ground of the image forming device 200, or a further voltage source (different from the voltage source 206).

In FIG. 2B, the lever 116 has been moved to its second position by the actuator 118, so that the electrical switch 202 is active to allow the voltage from the voltage source 206 to be applied to the disruption element 204 (i.e., the disruption element 204 is set in the active state).

In some examples, the disruption element 204 can be a disruption charging element in the form of a charging roller, a corona charger, or any other type of charging element. When the voltage of the voltage source 206 is not connected to the disruption charging element, the disruption charging element is inactive or set in a state different from the active state, so that an electrostatic latent image formed on the outer surface of the photosensitive drum 124 by the imaging charging element 130 and the light source 132 is not disturbed by the disruption charging element. With the disruption charging element being inactive, normal transfer of toner from the developing roller 104 to the photosensitive drum 124 can proceed during image forming operations of the image forming device 200.

In further examples, the disruption element 204 can include an erase light source that when energized emits a light onto the outer surface of the photosensitive drum 124. The light emitted by the erase light source can be used to reset the charge on the outer surface of the photosensitive drum 124, by irradiating an entirety or selected parts of the photosensitive layer of the photosensitive drum 124. This irradiation disrupts (completely removes or modifies) the electrostatic latent image formed on the photosensitive drum 124.

When the voltage of the voltage source 206 is not connected to the erase light source, the disruption charging element is inactive, so that an electrostatic latent image formed on the outer surface of the photosensitive drum 124 by the imaging charging element 130 and the light source 132 is not disturbed by the erase light source. With the erase light source being inactive, normal transfer of toner from the developing roller 104 to the photosensitive drum 124 can proceed during image forming operations of the image forming device 200.

As an example, during an image forming operation, after the imaging charging element 130 has applied an electric potential to the outer surface of the photosensitive drum 124 and the light source 132 has irradiated modulated light 134 onto selected portions outer surface of the photosensitive drum 124 to form an electrostatic latent image, the disruption element 204 can be used to disrupt the electrostatic latent image on the photosensitive drum 124.

To perform the disruption, the controller 122 can control the actuator drive assembly 120 to move the actuator 118 to the second position shown in FIG. 2B. The actuator when moved to the second position causes the lever 116 to set the electrical switch 202 in an active state, which connects the voltage of the voltage source 206 to the disruption element 204. As a result, the disruption element 204 is activated.

The disruption element 204 is downstream of the imaging charging element 130 in the rotational direction 128 of the photosensitive drum 124, and is upstream of the supply region 125 where toner is to be transferred from the developing roller 104 to the photosensitive drum 124. As a result, before the electrostatic latent image on the outer surface of the photosensitive drum 124 can reach the supply region 125 between the developing roller 104 and the photosensitive drum 124, the active disruption element 204 causes a reset or other type of disruption of the electrostatic latent image on the photosensitive drum 124 so that the electrostatic latent image is either removed or substantially modified. As a result, toner is not transferred in the target manner from the developing roller 104 to the photosensitive drum 124 in the supply region 125, since the electrostatic latent image has been substantially modified.

Figure 3A:
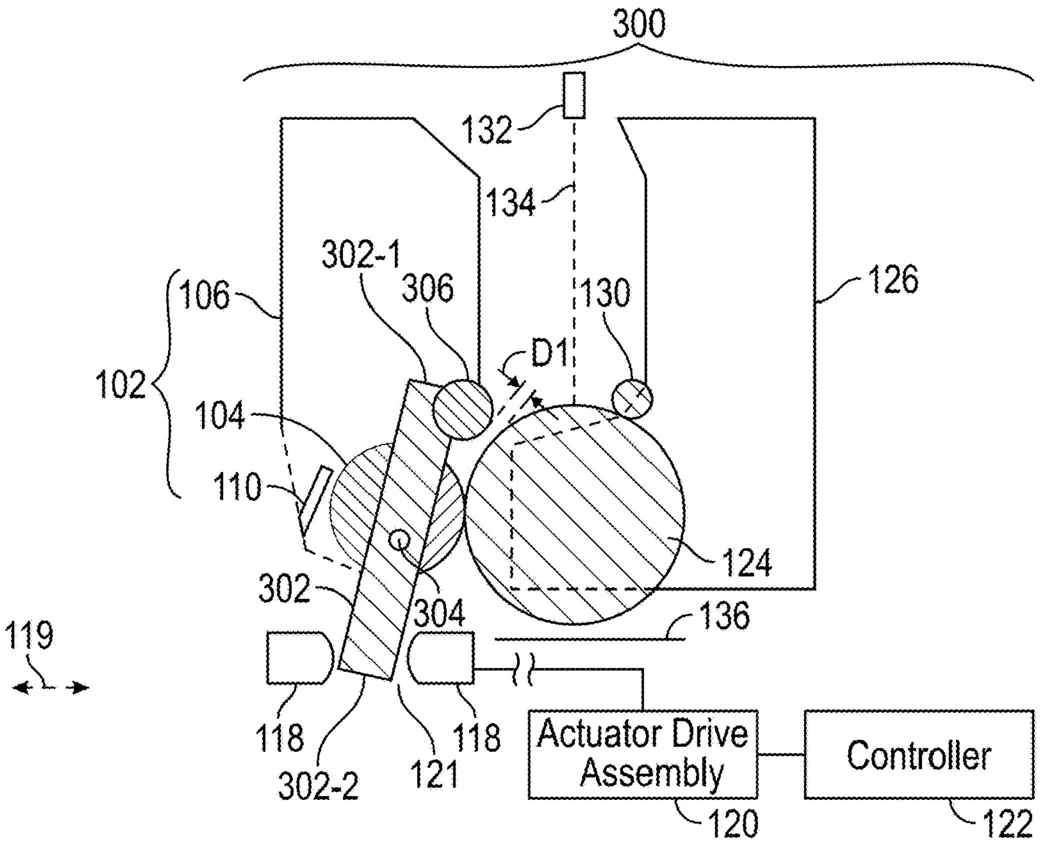
Figure 3B:
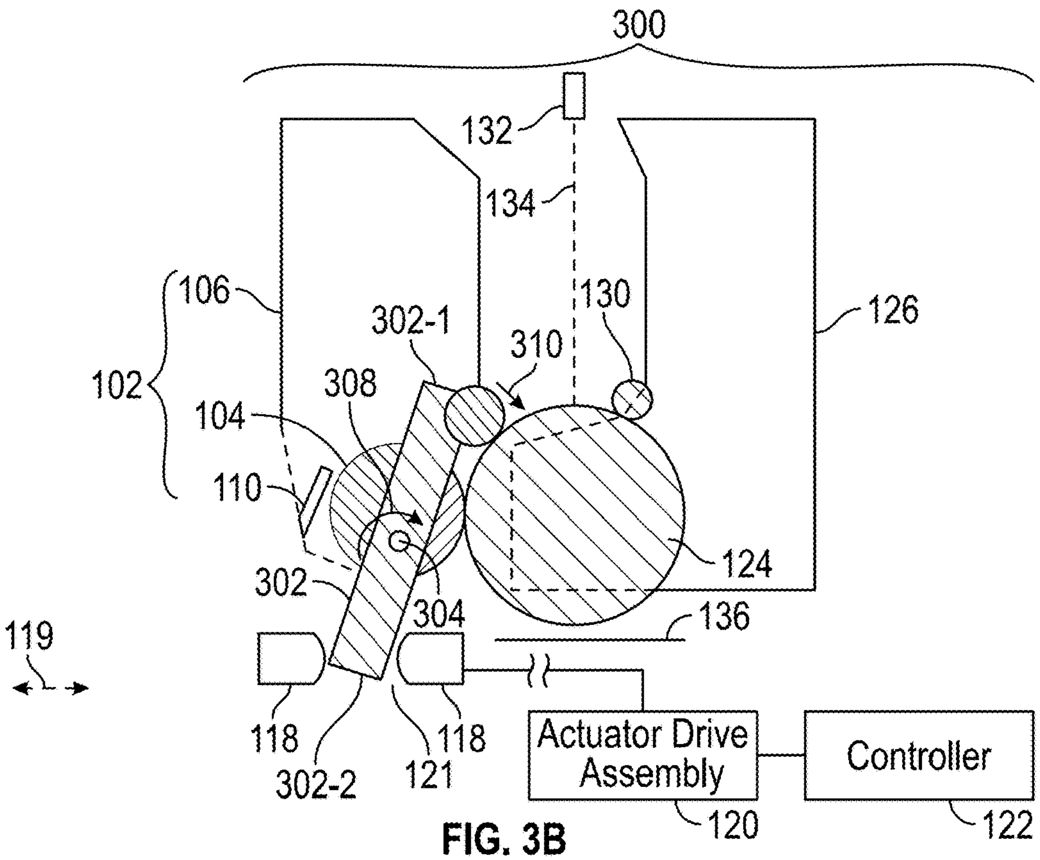

FIGS. 3A-3B show an image forming device 300 according to additional examples of the present disclosure. Components of the image forming device 300 similar to those of the image forming device 100 of FIGS. 1A-1B share the same reference numerals.

In examples according to FIGS. 3A-3B, the actuator 118 when moved causes a corresponding rotational motion of a pivot member 302 that is pivotably attached to a housing (e.g., the housing of a cartridge) at a pivot point 304. Thus, motion of the actuator 118 along the axis 119 causes a rotational motion of the pivot member 302 at the pivot point 304.

In FIG. 3A, the pivot member 302 is at a first pivot position, in which a disruption charging element 306 attached to a first end portion 302-1 of the pivot member 302 is spaced apart from the outer surface of the photosensitive drum 124 by greater than a specified distance D1. When the disruption charging element 306 is spaced apart by at least the specified distance D1, the disruption charging element 306 would not affect the electrostatic latent image formed on the outer surface of the photosensitive drum 124 by the imaging charging element 130.

A second end portion 302-2 of the pivot member 302 is received in the receptacle 121 of the actuator 118. Movement of the actuator 118 engages the second end portion 302-2 of the pivot member 302 to cause rotational motion of the pivot member 302.

In FIG. 3B, the actuator 118 has been moved to the left in the view of FIG. 3B, which causes the pivot member 302 to rotate in a rotational direction 308, to cause the disruption charging element 306 to engage the outer surface of the photosensitive drum 124. The rotation of the pivot member 302 causes the disruption charging element 306 to move in a direction 310 towards the photosensitive drum 124. It is assumed that the disruption charging element 306 remains energized, so that the engagement of the disruption charging element 306 with the photosensitive drum 124 causes a disruption of the electrostatic latent image formed on the outer surface of the forces of the drum 124 by the light source 132.

"Engagement" of the disruption charging element 306 with the outer surface of the photosensitive drum 124 refers to a physical contact of the disruption charging element 306 with the outer surface of the photosensitive drum 124, or otherwise bring the disruption charging element 306 into sufficiently close proximity with the outer surface of the photosensitive drum 124 such that the disruption charging element 306 can disrupt the electrostatic latent image formed on the outer surface of the photosensitive drum 124.

In the state shown in FIG. 3A, normal transfer of the toner from the developing roller 104 to the photosensitive drum 124 can occur, since the disruption charging element 306 does not disrupt the electrostatic latent image formed on the photosensitive drum 124.

On the other hand, in the state shown in shown in FIG. 3B, the disruption charging element 306 causes disruption of the electrostatic latent image formed on the photosensitive drum 124, so that toner transfer from the developing roller 104 to the photosensitive drum 124 is disrupted.

Figure 4:
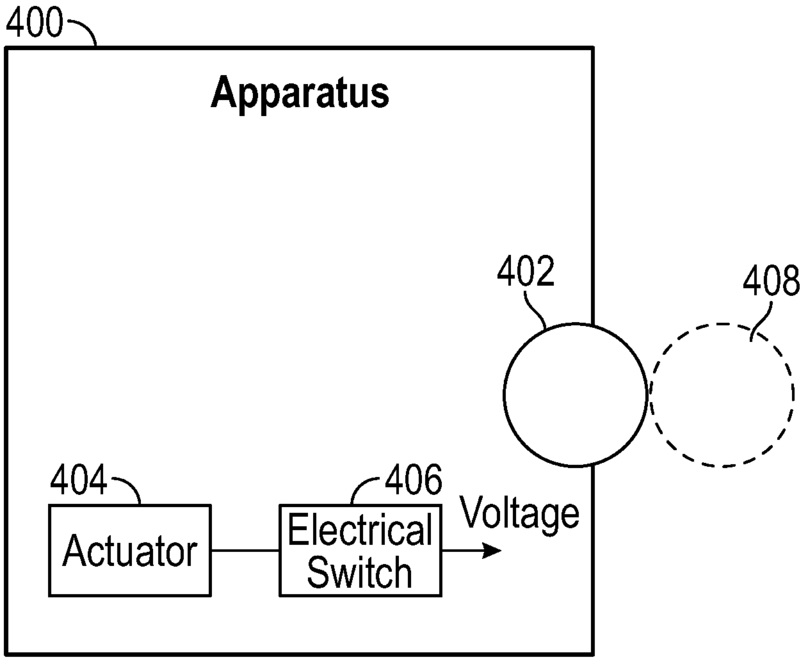
FIG. 4 is a block diagram of an apparatus according to some examples.

FIG. 4 is a block diagram of an apparatus 400 according to some examples. The apparatus 400 may be part of a cartridge that is removably insertable into an image forming device, such as any of image forming devices 100, 200, and 300.

The apparatus 400 includes a developer 402 (e.g., the developing roller 104 discussed above) to receive a toner, such as from a reservoir. The apparatus 400 further includes an actuator 404 moveable between different positions, such as the actuator 118 discussed above.

The apparatus 400 further includes an electrical switch 406 that is responsive to an input stimulus from the actuator 404 to control a voltage that enables or disrupts a transfer of the toner from the developer 402 to a photoreceptor 408 (e.g., the photosensitive drum 124 discussed above). The electrical switch 406 when in a first state sets the voltage at a first level to enable the transfer of the toner from the developer 402 to the photoreceptor 408, and the electrical switch 406 when in a second state sets the voltage at a second level to disrupt the transfer of the toner from the developer 402 to the photoreceptor 408.

In some examples, the electrical switch 406 when in the first state enables application of a bias voltage from a voltage source to the developer 402, and the electrical switch when in the second state removes application of the bias voltage to the developer 402, such that the developer 402 is set to a ground reference or another voltage different from the bias voltage.

The electrical switch 406 when in the first state enables application of the bias voltage to a toner regulator (e.g., the regulator 110 discussed above), and the electrical switch 406 when in the second state removes application of the bias voltage to the toner regulator.

Figure 5:
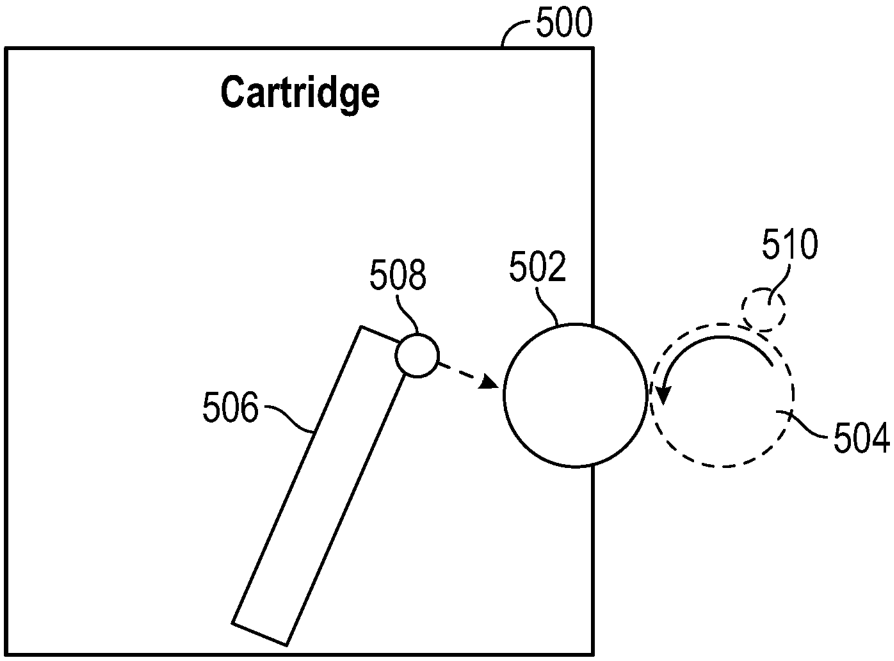
FIG. 5 is a block diagram of a cartridge for an image forming device, according to some examples.

FIG. 5 is a block diagram of a cartridge 500, which may be removably mounted in an image forming device (e.g., any of 100, 200, or 300).

The cartridge 500 includes a developing roller 502 to transfer a toner to a photosensitive drum 504 of the image forming device.

The cartridge 500 includes a moveable support 506 that is moveable between a first position and a second position by an actuator responsive to control of the image forming device.

The cartridge 500 includes a first charging element 508 (e.g., 306 in FIGS. 3A-3B) on the moveable support 506. The first charging element 508 when energized has a voltage. The first charging element 508 is disengaged from the photosensitive drum 504 when the moveable support 506 is at the first position, and the first charging element 508 is engaged with the photosensitive drum 504 when the moveable support 506 is at the second position.

The first charging element 508 when engaged with the photosensitive drum 504 is downstream, in a rotational direction of the photosensitive drum 504, of a second charging element 510 that charges a surface of the photosensitive drum 504.

Figure 6:
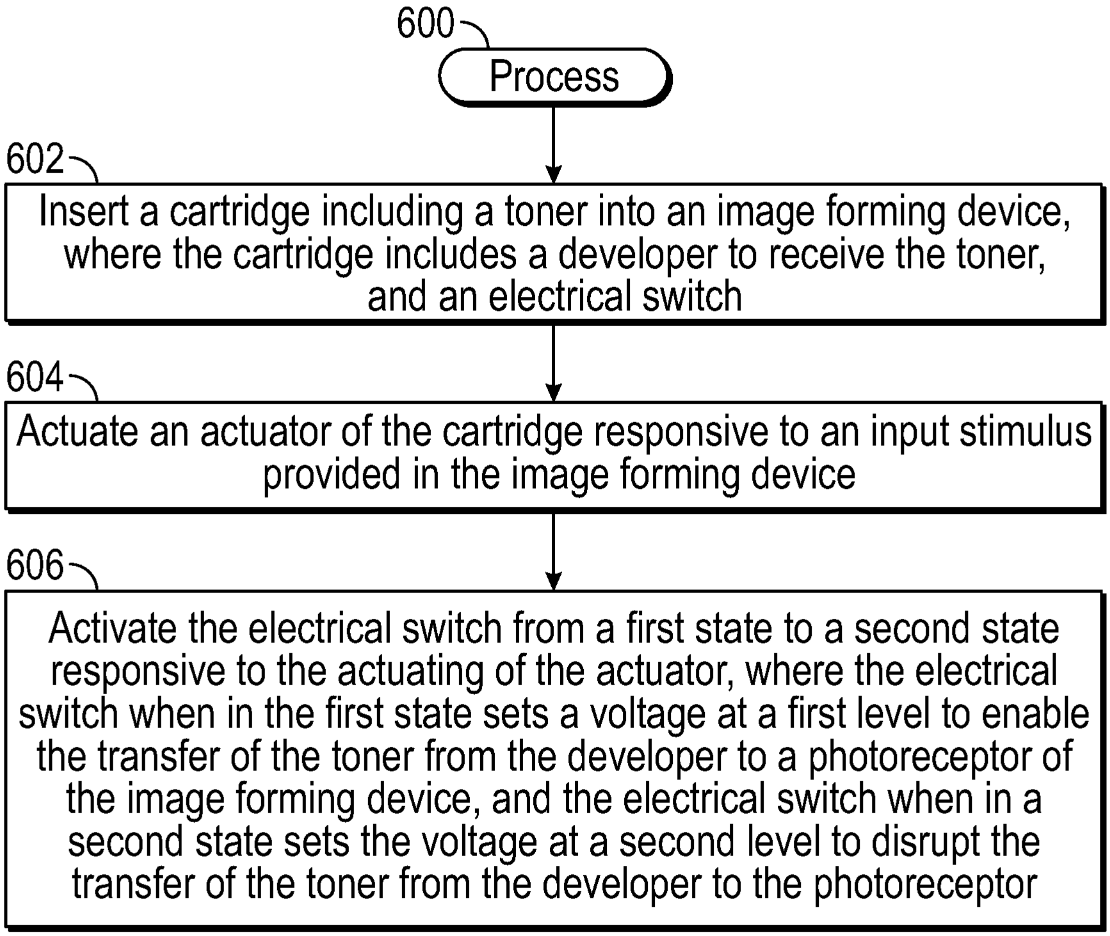
FIG. 6 is a flow diagram of a process according to some examples.

FIG. 6 is a flow diagram of a process 600 according to some examples. The process 600 includes inserting (at 602) a cartridge including a toner into an image forming device, where the cartridge includes a developer to receive the toner, and an electrical switch.

The process 600 includes actuating (at 604) an actuator of the cartridge responsive to an input stimulus provided in the image forming device.

The process 600 includes activating (at 606) the electrical switch from a first state to a second state responsive to the actuating of the actuator, where the electrical switch when in the first state sets a voltage at a first level to enable the transfer of the toner from the developer to a photoreceptor of the image forming device, and the electrical switch when in a second state sets the voltage at a second level to disrupt the transfer of the toner from the developer to the photoreceptor.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. An apparatus comprising:

a developer to receive a toner;

an actuator moveable between different positions; and an electrical switch responsive to an input stimulus from the actuator to control a voltage that enables or disrupts a transfer of the toner from the developer to a photoreceptor, the electrical switch when in a first state to set the voltage at a first level to enable the transfer of the toner from the developer to the photoreceptor, and the electrical switch when in a second state to set the voltage at a second level to disrupt the transfer of the toner from the developer to the photoreceptor.

2. The apparatus of claim 1, wherein the actuator is moveable responsive to operation by an actuator drive assembly of an image forming device.

3. The apparatus of claim 1, wherein the electrical switch when in the first state enables application of a bias voltage from a voltage source to the developer, and the electrical switch when in the second state removes application of the bias voltage to the developer.

4. The apparatus of claim 3, wherein the electrical switch when in the first state enables application of the bias voltage to a toner regulator, and the electrical switch when in the second state removes application of the bias voltage to the toner regulator.

5. The apparatus of claim 1, wherein the developer comprises a developing roller, and the photoreceptor comprises a photosensitive drum.

6. The apparatus of claim 1, further comprising:

a charging element that when set to an active state transfers a voltage to a surface of the photoreceptor, wherein the electrical switch when in the first state sets the charging element in the active state, and the electrical switch when in the second state sets the charging element in a state different from the active state.

7. The apparatus of claim 6, wherein the charging element comprises a corona charger.

8. The apparatus of claim 6, wherein the charging element is spaced apart from the photoreceptor when transferring the voltage to the surface of the photoreceptor.

9. The apparatus of claim 6, wherein the transfer of the voltage to the surface of the photoreceptor when the charging element is set to the active state causes a modification of an electrostatic image formed on the photoreceptor by a light source.

10. The apparatus of claim 1, further comprising:

an erase light source that when energized emits a light onto a surface of the photoreceptor to cause a modification of an electrostatic image formed on the photoreceptor by another light source, wherein the electrical switch when in the first state energizes the erase light source, and the electrical switch when in the second state deenergizes the erase light source.

11. A cartridge for an image forming device, comprising:

a developing roller to transfer a toner to a photosensitive drum of the image forming device;

a moveable support that is moveable between a first position and a second position by an actuator responsive to control of the image forming device;

a first charging element on the moveable support, the first charging element when energized having a voltage, wherein the first charging element is disengaged from the photosensitive drum when the moveable support is at the first position, and the first charging element is engaged with the photosensitive drum when the moveable support is at the second position, wherein the first charging element when engaged with the photosensitive drum is downstream, in a rotational direction of the photosensitive drum, of a second charging element that charges a surface of the photosensitive drum.

12. The cartridge of claim 11, wherein the first charging element when engaged with the photosensitive drum causes a modification of an electrostatic image formed by a light source on the photosensitive drum.

13. The cartridge of claim 11, wherein the moveable support is pivotable between the first position and the second position.

14. A method comprising:

inserting a cartridge comprising a toner into an image forming device, the cartridge comprising a developer to receive the toner, and an electrical switch; and actuating an actuator of the cartridge responsive to an input stimulus provided in the image forming device; and activating the electrical switch from a first state to a second state responsive to the actuating of the actuator, wherein the electrical switch when in the first state sets a voltage at a first level to enable the transfer of the toner from the developer to a photoreceptor of the image forming device, and the electrical switch when in a second state sets the voltage at a second level to disrupt the transfer of the toner from the developer to the photoreceptor.

15. The method of claim 14, wherein the voltage comprises one of:

a biasing voltage applied to the developer, or an input voltage applied to a charging element or an erase light source, the charging element or the erase light source being part of the cartridge.

* * * * *